(12) United States Patent
Clark

(10) Patent No.: US 6,351,738 B1
(45) Date of Patent: Feb. 26, 2002

(54) COLLECTIVE BUSINESS SYSTEM

(76) Inventor: Douglas W. Clark, 373 Hickory La., Haddonfield, NJ (US) 08033

(*) Notice: Subject to any disclaimer, the term of this patent is extended or adjusted under 35 U.S.C. 154(b) by 0 days.

(21) Appl. No.: 09/317,560

(22) Filed: May 24, 1999

(51) Int. Cl.$^7$ ............................................. G06F 17/60
(52) U.S. Cl. ............................ 705/37; 705/9; 705/26; 705/27
(58) Field of Search ............................... 705/9, 26, 27, 705/37

(56) References Cited

U.S. PATENT DOCUMENTS

| | | | |
|---|---|---|---|
| 4,799,156 A | * 1/1989 | Shavit et al. | 705/26 |
| 5,717,989 A | * 2/1998 | Tozzoli et al. | 705/37 |
| 5,963,915 A | * 10/1999 | Kirsch | 705/26 |
| 5,970,475 A | * 10/1999 | Barnes et al. | 705/27 |
| 5,974,395 A | * 10/1999 | Bellini et al. | 705/9 |

FOREIGN PATENT DOCUMENTS

| WO | WO 97/24691 | * 7/1997 | G06F/153/00 |
|---|---|---|---|

OTHER PUBLICATIONS

Dalton, Gregory, "Software vendors create more hybrid applications...", Information Week, p. 101, May 4, 1998.*
Business Wire; "Business Marketing Group and International franchise Association Announce Team Agreement", Jan. 22, 1999.*
William J. Angelo; Giving Entrepreneurial Engineers A Way to Be Their Own Boss ENR; NewYork; May 12, 1997.*
By Sarah Lubman; Hotel Franchiser's Real–Estate Foray Puzzles Industry—Silverman's Intention to Buy Century 21 Produces Many Reservation; Wall Street Journal; New York; Jun. 29, 1995.*
Criterium Engineers, Print–out of Non–Member Portion of Website www.criteriumengineers.com (Apr. 2, 2001).

* cited by examiner

Primary Examiner—Vincent Millin
Assistant Examiner—Jagdish N Patel
(74) Attorney, Agent, or Firm—Klehr, Harrison, Branzburg & Ellers LLP; John F. Letchford

(57) ABSTRACT

A collective business system including participants engaged in a common field of business endeavor, a plurality of suppliers of business support mechanisms of interest to the participants and a for-profit hub business entity for managing transactions between the suppliers, the participants and their customers. Under the system, the independently owned and operated participants are assigned geographically protected business locations, as well as one or more of volume discounts of goods and services, national marketing capacity, discount capital financing for purchase of costly technology and machinery, access to information technology, logistics support or other business support mechanisms. The assets of the hub business entity are substantially liquid asset based and the hub business entity enables, controls and derives income from transactions between the suppliers and participants. The system enables the participants to compete effectively with much larger corporate or similar entities or franchises in the same or similar industry or profession without sacrificing their independence.

26 Claims, 5 Drawing Sheets

COLLECTIVE BUSINESS SYSTEM

FIELD OF THE INVENTION

The present invention relates in general to collective business systems and in particular, to a collective business system including methods and apparatus for providing premium business support mechanisms from suppliers thereof to independent companies, tradespersons or professionals in a common field of endeavor through a substantially liquid asset based, for-profit business entity. By virtue of the system, the participating business entities receive enhanced purchasing power, national marketing capabilities and other business leverage support to compete effectively with much larger competitors in their industry.

BACKGROUND OF THE INVENTION

Collective business systems, as referred to herein, include business organizations or associations typically comprised of relatively large numbers of businesses, tradespersons or professionals in the same or related fields of endeavor, which pool resources, share information or provide other benefits for their members. In the past, collective business systems such as the trade association, the cooperative and the franchise were created to allow groups of independently owned businesses with common interests to successfully compete in the marketplace.

Beginning in the latter part of the twentieth century, the business world has witnessed the consolidation of all types of businesses through mergers, rollups or acquisitions. Typically, by the end of the consolidation process, a particular industry or profession becomes dominated by three or four nationally-based enterprises. Under these circumstances, the small, local, independent company is often forced to sell to one of the dominant entities because it can no longer compete profitably with large consolidated organizations. Typically, locally based businesses are unable to compete because they lack the capital, global marketing capabilities, purchasing power and expensive technology necessary to operate efficiently. This trend toward consolidation is expected to continue well into the twenty-first century.

Presently, and for the foreseeable future, the inherent limitations of traditional collective business systems such as the trade organization, the cooperative and the franchise render them considerably less effective than they once were in advancing the business interests of their constituents. The following is a brief synopsis of those traditional collective business systems.

1. Trade Association

Trade associations are non-profit organizations in which the individual members are companies or individuals engaged in a common business pursuit. Competitors join together to create a platform format in which they deal with common problems of their industry. Any applicant meeting the standards of the association must be accepted as a member. Anti-trust law prohibits a member trade association from denying an otherwise qualified applicant's membership based upon a geographical proximity to an existing member. Trade associations commonly offer their members educational programs, the opportunity to come together at meetings to discuss common problems, and marketing materials designed to be imprinted by each member with its relevant information. Trade associations also offer elective group purchasing plans. The trade association bears no credit risk in these transactions but instead, provides chosen vendors with access to a large body of member customers. Because the trade association does not pledge its credit, the vendor must rely upon the credit worthiness of each purchaser.

To sustain its operations, a trade association generally receives an initiation fee and/or a yearly membership fee (collectively "dues") from its members, and it may collect rebates or commissions from the purchasing plan suppliers.

2. Cooperative

A cooperative is a non-profit organization somewhat similar to a trade association. A significant difference between the cooperative and the trade association, however, is that with a trade association, the members have a non-equity position in the association, whereas in the typical cooperative the members will have an equity interest as all members of the cooperative own a portion of the cooperative. Generally, a cooperative only addresses one facet of business operation needs of interest to its members, e.g., purchasing of goods and services at advantageous prices. A purchasing cooperative is at risk in that it holds considerable assets in the form of inventory and provides credit to the businesses in the cooperative. In addition, the members of the cooperative risk loss of invested capital if the cooperative proves unsuccessful.

The cooperative utilizes its volume leverage with suppliers in purchasing products and services for less than the individual member company could obtain outside of the cooperative. The cooperative marks up the purchased products or services in order to cover operating expenses. Any net income achieved by the cooperative is then returned to the cooperative members in the form of a redistribution of profits or dividends. Like a trade association, cooperatives cannot exclude members on the basis of geography or create exclusive territories.

There are also cooperatives in which the sole function is for marketing and advertising in a given region. New car dealers and fast food franchisees typically form marketing and advertising cooperatives.

3. Franchise

The franchise is a for-profit collective business system wherein the franchiser offers proprietary products or services to its franchisees. The franchiser generally gives considerable marketing support to its franchisees. In exchange, the franchisees are subject to a substantial amount of control by the franchiser concerning its operations and marketing including the use of the franhisor's trade names, trademarks and copyrighted materials. A franchisee's employees typically are required to wear uniforms and to dress as specified by the franchisor. Franchises can be offered by the franchisor on a teritorial basis without violating antitrust laws. Ordinarily, the franchisee owns the non-real estate assets of a franchise. There is generally a substantial fee paid by the franchisee for the privilege of becoming a franchisee. This is followed by a period of training that is offered on an ongoing basis throughout the franchise. Most states have laws highly protective of franchisees in prohibiting the franchisor from terminating the franchise so long as the franchisee meets predetermined business requirements and does not otherwise violate the terms of the franchise agreement.

The franchisor derives income from the initial franchise fees and products and services, which are offered to the franchisees on either a mandatory or optional purchase basis. The franchisor generally derives additional income based upon a percentage of the volume of business conducted by the franchisee. The franchise agreement also usually provides that the franchisee can only sell products supplied or approved by the franchisor.

Among the traditional collective business systems only the franchise can create exclusive trade territories. Conversely, however, the franchise structure severely inhibits the independence of the franchisee and the success of the franchisee is inextricably tied to the success of the franchisor. The franchisee is not free to introduce non-approved products or services and is generally precluded from introducing innovative business or marketing strategies by the extensive control imposed by the franchisor.

The trade organization imposes relatively low membership dues on its members. However, because initiation fees and annual membership fees are nominal, the trade organization lacks the ability to engage in offering its members national marketing capability, access to expensive technologies and cost-effective purchasing programs for major purchases due to a lack of capital. Furthermore, being non-profit, trade associations do not have the management mentality necessary to sustain major projects such as national sales and marketing. Today, they are of little help in enabling their small, independent members to compete with large national competitors.

Cooperatives, like trade associations, are hampered because they cannot carve out or assign geographic territories to their individual members and are limited to executing a single business function, e.g., purchasing of products and services or marketing.

An advantage exists, therefore, for a collective business system, which can enable independent business entities in a common field of endeavor to compete effectively with large nationally and internationally based competitors. The collective business system should be structured to include a substantially liquid asset based, for-profit business entity which can assign geographic territories of operation to its participants, as well as provide its participants with purchasing power leverage, discount capital financing, global marketing capabilities, access to high cost technology and a broad range of goods and services. The system should not impose burdensome dues or other fees on its members. And, for participants who are also shareholders in the for-profit business entity, the system offers additional financial rewards in terms of equity growth and dividend distributions.

SUMMARY OF THE INVENTION

The present invention provides a collective business system comprising a substantially liquid asset based, for-profit hub business entity offering a menu of premium business support mechanisms on an out-source level to a group of independently owned companies or independent tradespersons or professionals engaged in a common field of endeavor. The recipients of these business support mechanisms may be referred to as "participants"and the providers thereof either "suppliers," "vendors" or the like. Because of its for-profit nature and that it is neither a trade organization nor a cooperative, the hub business entity may assign each participant in the system an exclusive geographical territory. This provides a base-level competitive advantage to each participant in that its business activities will not be in geographic competition with and subject to dilution or detraction by other participants in the system. The menu of business support mechanisms offered by the hub business entity to the participants on an out-source basis are preferably those necessary to enable individual participants to remain competitive with much larger businesses, but which would otherwise be economically infeasible for the participants to acquire or utilize on an in-house basis. The system offers to its participants business support mechanisms including, without limitation, discount capital financing, national marketing capabilities, access to high technology, enhanced purchasing power, logistics support and accessibility to highly specialized business consulting services.

The present system effectively and efficiently serves local independent businesses or professional entities or organizations who join the system through a contractual relationship with a substantially liquid asset based, for-profit business entity herein referred to as a "hub business entity" or "HBE." The HBE, which may be a corporation, a partnership or any species, variant or hybrid thereof, provides a platform for the participants to effectively compete against much larger business organizations and enterprises.

By virtue of the HBE, the present collective business system incorporates various advantageous aspects of prior art business mechanisms, but is much more robust and all-encompassing than the collective business systems heretofore known in the art. The HBE is multi-dimensional, multi-layered, complex, and utilizes a high degree of sophisticated technology.

The present collective business system, hereinafter referred to as the hub business entity system or "HBES" is made up of several factors designed to serve a multitude of business needs of its participants. A non-limitative listing of these factors and business needs includes:

1. a for-profit hub business entity ("HBE");
2. a geographically-segmented group of participants in the HBE;
3. an array of independent goods, services or programs suppliers;
4. a consolidating industry or profession (or field of common endeavor)
5. an industry where the HBE can effectuate lower purchase costs through volume than any individual participant could obtain outside the HBE;
6. the need for a nationally recognizable "brand" name; and
7. sophisticated technology requirements such as an industry-specific e-commerce system and other higher order of technology than the individual participants could obtain outside the HBE;

The present invention also contemplates accommodation of participants' or HBE's customers or potential customers in the same or similar industry served by the collective business system. Such customers may have multiple locations on a regional, national or even international level or they may be single large volume customers requiring a large asset base to service.

The HBE is an essential element of the HBES. The HBE has only minimal capital requirements, most of which are devoted to start-up costs. The HBE's assets will be comprised of cash, receivables and state-of-the-art technology. The HBE preferably Would hold no inventory or other substantial tangible assets, although it will assume credit risks in conjunction with group purchasing programs. Its business operations are preferably managed and accomplished by a minimum staff of individuals disciplined in, at least, national marketing and sales, group purchasing, creative financing and technology. Its principal asset will be an income stream derived from the programs, services and group purchasing plans, which it offers to the participants on an exclusive basis.

Once established, the HBE will offer a variety of premium products and services to a group of independently owned and operated participants in a common business or industry.

Because of the geographical exclusivity afforded by the HBE, each participant is insured that the HBE will not also support another participant within the described geographical territory, thereby providing an inherent competitive advantage similar to those bestowed by a franchisor on its franchisees. Unlike a franchise system, however, which requires the franchisee to obtain products and services from the franchisor, the participants can elect from a "menu" of business support mechanisms which it wishes to receive from an array of independent (i.e., non-HBE-controlled) goods, services and other business support mechanism providers. Accordingly, each participant is free to procure any desired assortment of products, services and other business support mechanism options, both within and outside of the system, which are not under control of the HBE. The HBE also will not compete with trade organizations. It is anticipated that participants may maintain their trade organization memberships, if they so choose, but will contract for the premium products, services and other business support mechanisms offered by the HBE, which a trade organization would not ordinarily supply.

Operation of the HBE is preferably conducted by a suitable electronic commerce ("e-commerce") system to which all participants will be required to join. The HBE e-commerce system will link the HBE, selected suppliers, participants and customers in an essentially paperless network of commerce. The participants will be able to access product information and submit orders directly to the HBE's selected vendors. The vendor, however, will invoice the HBE and the HBE in turn will invoice the participant for its purchases. By assuming the credit risk for a large volume of transactions, the HBE is able to negotiate better prices than individual participants might otherwise obtain for themselves from the suppliers. The HBE will receive commissions or rebates from the vendors, some or all of which may be shared at the discretion of the HBE with the participants to further lower the cost of the purchases. In addition, the e-commerce system will allow participants to access software programs offered by the HBE. Customers may also access the HBE to obtain information and technology services, while purchasing goods and other services directly from the participants.

The HBE controls the income streams generated by the business support mechanisms offered to the participants and customers. The HBE incurs no capital-intensive risk in that it holds virtually no tangible assets and the capital expenditures are made by the participants at discounted acquisition costs and financing rates. Participants in the HBES who are also shareholders in the HBE may also receive additional financial benefits such as equity growth in their shares and dividend distributions.

The HBES is a unique vehicle which will allow a group of independent entities in a common industry, trade or profession to be linked together through the HBE so that they will be able to compete with much larger competitors and to avoid the economic pressure to sell or merge with larger industry-wide competitors. Some of the premium services and advantages offered by the HBES to its participants include, at a minimum, the following:

1. geographically assigned business locations;
2. national and international sales and marketing capabilities and the incremental revenue derived therefrom;
3. group purchasing plans to include discounted goods and services and discounted purchasing programs for capital purchases;
4. linkage of the HBE, participants, and vendors through sophisticated e-commerce system;
5. sophisticated technology services not economically feasible to a local stand alone company;
6. strategic alliances with national organizations representing potential customers for the goods or services offered by the participant;
7. access to capital financing at lower interest rates than the participant can obtain on its own; and
8. the ability for the equity participants to be part of an IPO without losing control via the IPO route.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings, wherein.

DETAILED DESCRIPTION OF THE INVENTION

Figure 1:
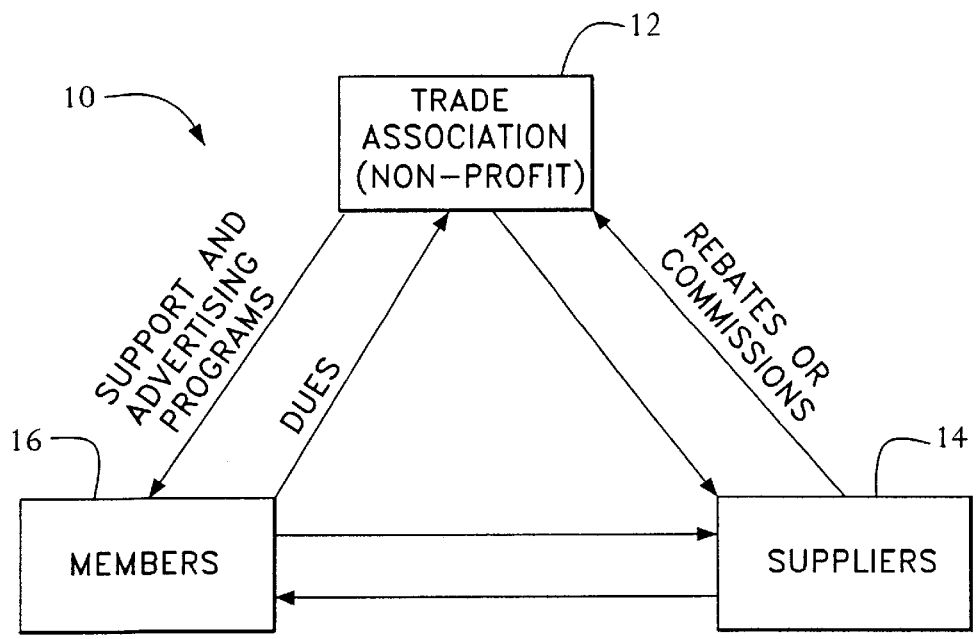
FIG. 1 is a schematic representation of the capital structure and general operation of a traditional trade association.

Referring to the drawing figures, there is shown in FIG. 1 a depiction of a conventional trade association system, represented generally by reference numeral 10. The traditional trade association system is generally a tripartite collective business system wherein the non-profit trade organization 12 functions to link selected vendors or suppliers 14 with the members 16 of the organization. As is known, the members 16 are independent professionals, tradespersons or others who conduct business in a common field of endeavor.

For payment of dues, typically in the form of an annual membership fee possibly coupled with an initiation fee, the members 16, through trade association 12, are introduced to suppliers 14 of goods and services which are of particular interest to the members. To become a selected vendor having access to members 16, a supplier may provide the trade association with rebates, commissions or other incentives, which may be passed along to the members. The trade association 12 supports its operations by collection of dues from members 12 and any cash or equivalent funding it may receive from suppliers 14. In addition to its primary function of bringing together suppliers 14 with members 16, trade association 12 frequently provides its members with support and advertising programs, e.g., educational programs, pre-printed marketing materials and group meetings to discuss common problems among the membership.

Once introduced via trade association 12, members 16 purchase selected goods and/or services from, and make payments directly to, suppliers 14. Trade associations are forbidden under a long established body of antitrust law from assigning unique geographic territories of operation for its individual members 16. Thus, members 16 are free to compete with one another in overlapping and even identical geographic areas such that the activities of one member 16 may detract from another nearby member.

Trade associations are substantially asset-free, i.e., they hold no real property or inventory and little, if any, other tangible property. Their limited income prohibits trade associations from pledging credit, which might otherwise enable members to purchase expensive technology or machinery at attractive financing rates. Each member 16 must therefore purchase from a supplier based upon the member's own creditworthiness rather than that of the trade association 12. The members 16 do not have any mechanism to pool their credit resources to leverage discount financing from suppliers 14 of expensive capital items, e.g., computer systems, vehicles and machinery, that are vital to the vitality and growth of the businesses of the individual members.

Figure 2:
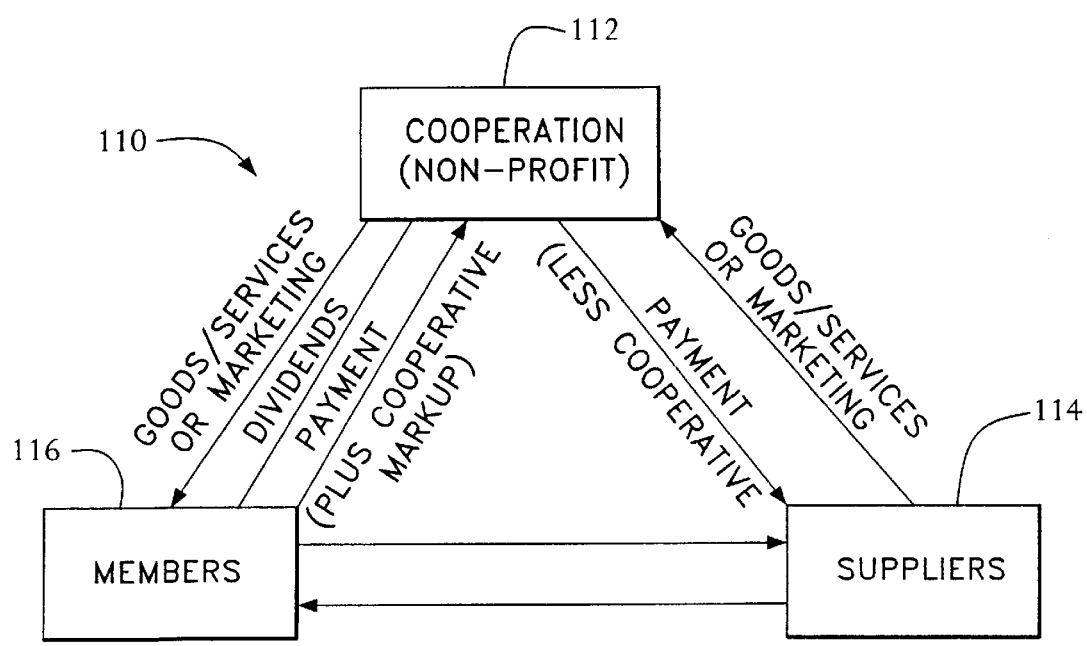
FIG. 2 is a schematic representation of the capital structure and general operation of a traditional cooperative.

The structure and operation of a traditional cooperative system is shown in FIG. 2. Generally, the cooperative system 110 consists of a non-profit cooperative 112 which, similar to a trade association, links selected vendors or suppliers 114 with members 116 of the cooperative. Being a non-profit organization like the trade association, the cooperative 112 may not legally assign geographically exclusive territories of operation, and their inherent competitive advantages, to its members 116. That is, cooperative 112 may not deny membership in the cooperative because of the geographic proximity of a potential member to and existing member.

Unlike a trade association, the members 116 of cooperative 112 are all shareholders in the cooperative. Each member 116 thus has an equity interest in, i.e., owns a portion of, cooperative 112. Cooperatives generally service only a single aspect or facet of business activity that may be of interest to the members. For instance, cooperative 112 may provide its members 116 with either discounted goods/services or marketing/advertising support from suppliers 114. Unlike a trade association system, payment for transactions occurring between suppliers 114 and members 116 in a cooperative system passes first from the individual member 116 to cooperative 112 and then from the cooperative 112 to the individual supplier 114 (rather than directly between the member and supplier in the trade association system discussed above). The cooperative 112 sustains itself primarily from the markups it attaches to the transactions between its members 116 and suppliers 114. Net income received by the cooperative is returned to members 116 in the form of dividends or the like. Cooperative 112 also typically provides capital financing to members 116 to facilitate their individual purchases of costly technology and machinery.

In a purchasing cooperative system, the cooperative 112 is tangible asset intensive in that it typically may hold a considerable inventory of goods for purchase by its membership. Cooperative 112 must therefore incur expense, e.g., rent, utilities, equipment, and personnel, for storing and handling the goods. In contrast with a trade association wherein individual members purchase directly from suppliers, the cooperative 112 purchases directly from suppliers 114 with considerable volume leverage which results substantial savings being ultimately passed on to members 116. In addition to maintenance costs, another disadvantage of holding a large amount of tangible assets in the form of inventory is that members 116 are at risk of loss of the invested capital if cooperative 112 experiences financial hardship.

Figure 3:
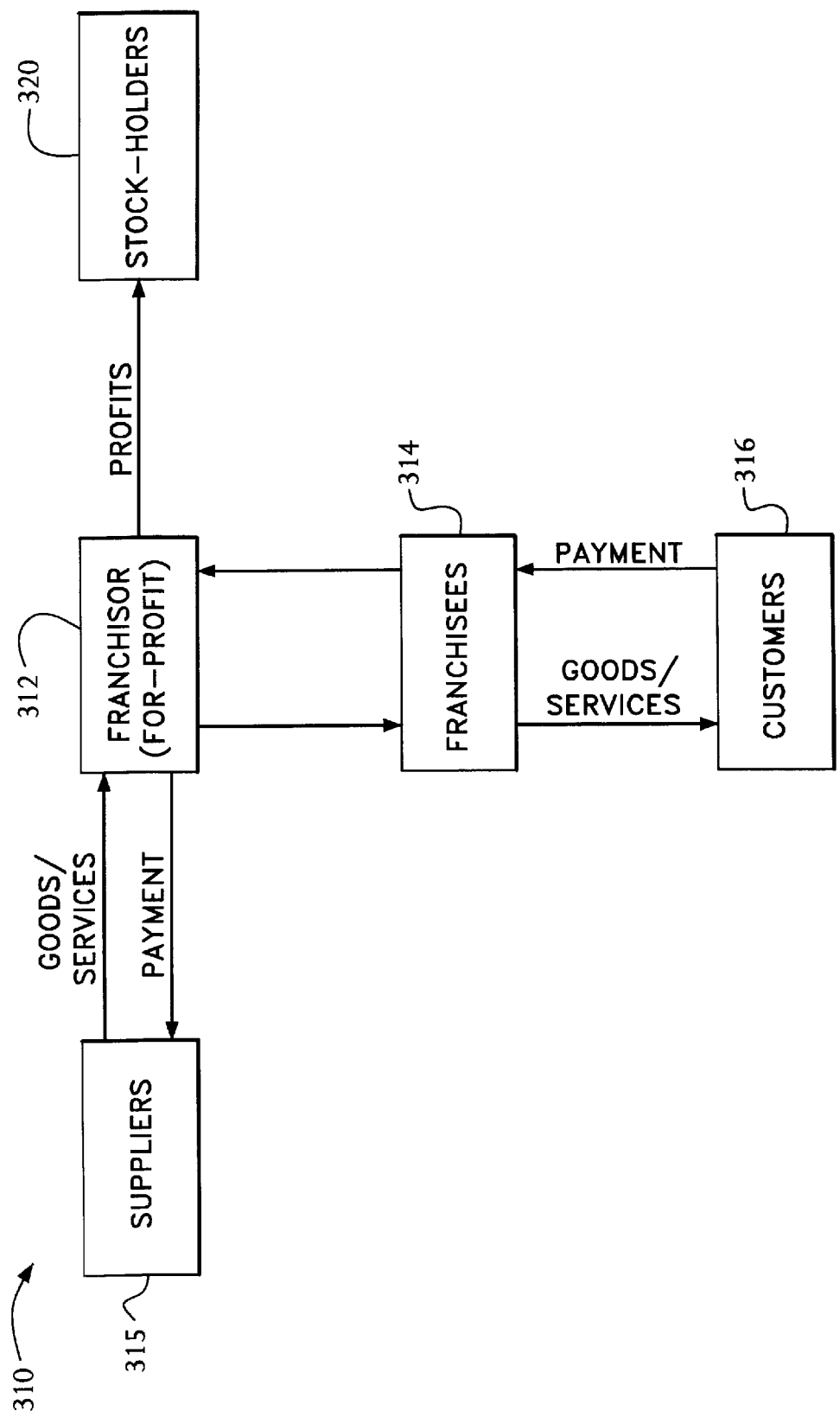
FIG. 3 is a schematic representation of the capital structure and general operation of a traditional franchise.

FIG. 3 graphically depicts the structure and operation of a franchise system 310. Franchise system 310 is a for-profit collective business system. Accordingly, franchisor 312 may assign exclusive geographical territories of operation to its individual authorized franchisees 314, thereby vesting a base-level competitive advantage in the franchisees. In a typical franchise situation, franchisees 314 sell the franchisor's authorized, proprietary goods or services at retail to customers 316.

Franchisor 312 selects and purchases goods or services that it authorizes for sale by its franchisees 314 directly from suppliers 318. If tangible goods are purchased, franchisor 312 may retain an inventory of the goods. Franchisees 314 in turn purchase the proprietary goods or services from franchisor 312 for resale to customers 316. In consideration for the goods and services sold to franchisees 314 and other business support provided to the franchisees, franchisor 312 typically receives payment from the franchisees 314 for individual franchisor-to-franchisee sales as well as additional fees or royalties derived from the final sales of the franchisor's goods or services from franchisees 314 to customers 316. Other benefits normally provided by the franchisor include regimented franchisee and employee training on the franchisor's preferred methods of conducting business, local and national marketing support, identifiable standards for the franchisor's goods and services, national identification or "name brand" consumer recognition (including use of the franchisor's trade names, trademarks and copyrighted materials/and the aforementioned territorial exclusivity.

Net profits realized by franchisor 312 are conveyed to its stockholders 320 in the conventional form of dividends and/or equity appreciation.

In exchange for the licenses or franchises it grants to its franchisees 314, the franchisor 312 imposes extensive limitations on how the franchisees 314 may conduct their business. For example, the franchisees 314 may sell only the franchisor's authorized proprietary goods and services; they may not acquire and sell unauthorized services or products. Franchisees employees typically must also wear the franchisor's designated uniforms and conduct business, including customer contact activities, in strict accordance with the franchisor's prescribed procedures. This pervasive and highly restrictive level of control, which is unique to the franchise among the traditional collective business systems, inhibits the franchisees ability and desire to introduce innovations or variety in products, marketing or other business practices which would be in the ordinary and desirable course of operations for independent businesspersons. Consequently, such institutional rigidity may hinder growth and prosperity of the franchise.

Additionally, the costs to potential franchisees to obtain the franchise and equipment and operating inventory for a properly functioning operation may involve startup costs, which may be prohibitive for many businesspersons.

Figure 4:
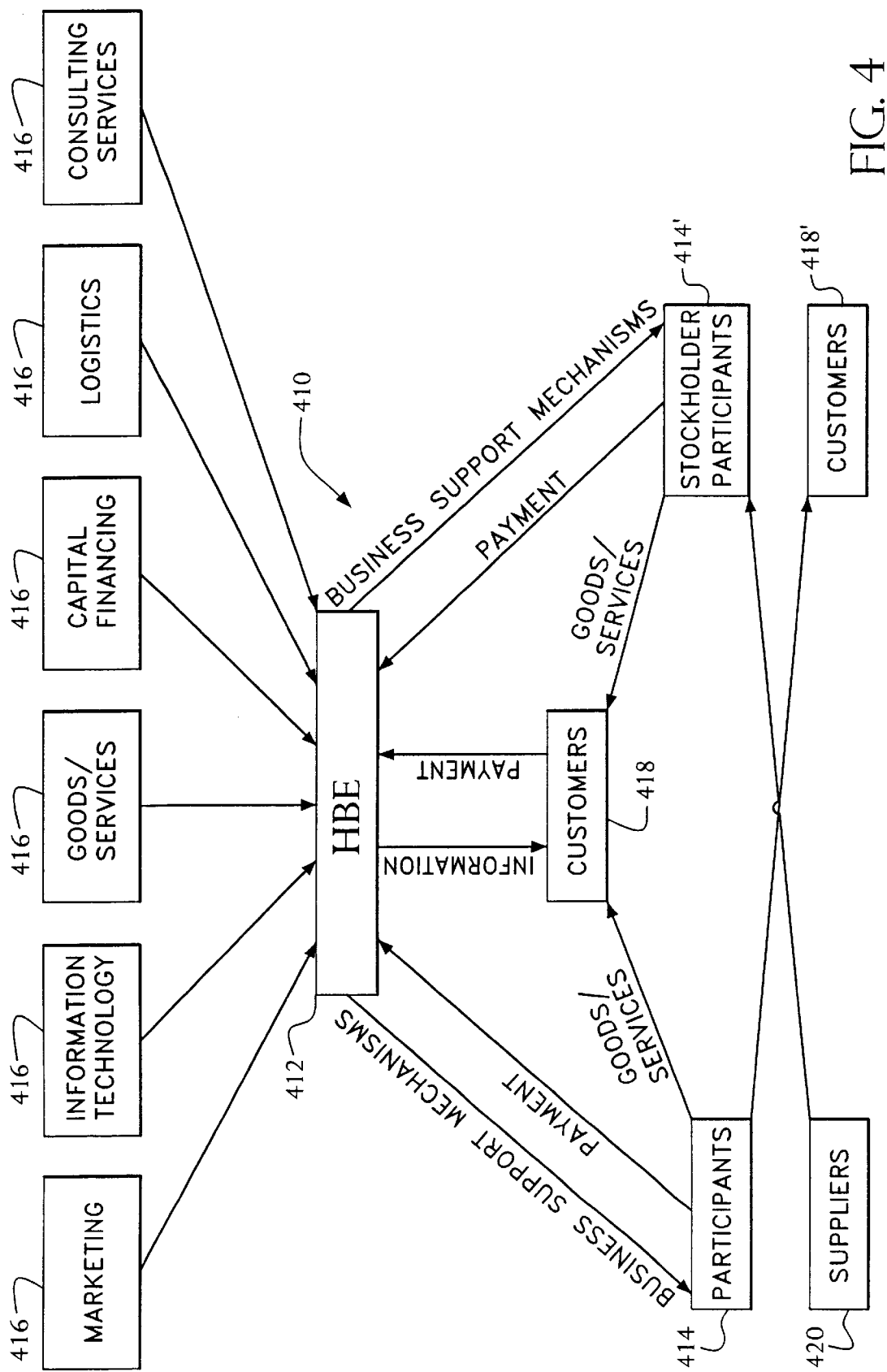
FIG. 4 is a schematic representation of the capital structure and general operation of the collective business system according to the present invention.

FIG. 4 reveals the capital structure and operation of a collective business system according to the present invention. The system, identified generally by reference numeral 410, may for descriptive but non-limitative purposes be described as a hub business entity system or "HBES". HBES 410 comprises a substantially liquid asset based, for-profit business entity 412 which links a plurality or group of members or participants 414 (including stockholder participants 414') and in a common field of business, trade or professional endeavor with a menu of business support mechanisms 416 of interest to the participants. The for-profit business entity 412 may be descriptively referred to as a hub business entity or "HBE" and may be structured as a corporation, a partnership or any species, variant or hybrid thereof. As will be described in greater detail hereinafter, HBE 412 provides a platform for locally-based, independently owned participants 414, 414' to effectively compete against much larger business organizations and enterprises in the same or similar field of endeavor. Business entities that would be eligible for participation in HBES 410 are virtually limitless. For example, participants 414, 414' may include building contractors and subcontractors, insurance or securities brokers, real estate brokers, accounting, architectural, engineering, scientific, transportation, distribution, manufacturing, retail vending, legal or medical consultants or specialists, and so on.

Being a for-profit entity unlike a trade association or cooperative, HBES 410 may assign exclusive geographic territories of operation to its participants 414, 414' and, thus, the competitive advantages attendant to such trade territories.

HBE 412 is substantially free of tangible assets and has minimal capital requirements, most of which are dedicated to start-up costs. It holds no inventory and its operations are preferably managed and accomplished by a minimum staff of individuals disciplined in national marketing and sales, group purchasing, creative finance, technology and, as the needs of HBE 410 may dictate, logistics and/or other areas of business support expertise. The assets of HBE 412 consist primarily of liquid assets such as cash and receivables derived from annual participants' membership fees, mark-ups or other commissions it earns on transactions between the suppliers of business support mechanisms 416 and participants 414, 414' and transactions between HBE 412 and customers 418 of the HBES 410. Since HBE 412 holds no inventory, it incurs none of the expense required for sustaining inventory or the capital-loss risk to the stockholder participants 414' in the event a particular HBES 410 should become unsuccessful. Other than a certain quantity of computer hardware and software upon which to implement its operations, HBE 412 possesses no other tangible assets such as land, buildings, equipment or vehicles. So configured, HBE 412 essentially functions to monitor and control the income and business support mechanisms streams between the participant's 414, 414', customers 418 and the suppliers of business support mechanisms 416.

Presently preferred, although not limitative, business support mechanisms 416 that may be made available to participants 414, 414' via HBE 12 include national marketing services, information technology products and support services, discount goods and services for resale, discount capital financing, and logistics support capabilities and consulting services. Thus, by virtue of HBE 412, participants 414, 414' have at their disposal an array of business support mechanisms 416 that can be selectively accessed as needs may arise to further the efficient operation and increased incremental revenue generation of their businesses. Preferably, the suppliers of business support mechanisms 416, participants 414 and customers 418 are contractually engaged with HBE 412 to effectuate their participation in HBES 410. Stockholder participants 414' have equity interests in the HBE 412 and receive equity benefits in addition to business support mechanisms 416. For example, stockholder participant's 414' are eligible to receive equity appreciation and dividends from HBE 412 which, at the individual participant's discretion, may be partially or wholly reinvested in the HBE. Because of the HBE's considerable volume leverage, it is able to obtain discounts for its participant's 414, 414' in goods and services necessary for the day-to-day operations of their businesses, trades and professions.

Optionally, customers 418 of participants 414, 414' or HBE 412 may access HBE 412 for a fee to obtain information and technology services of interest while purchasing other desired goods and services from the participants. Other customers 418' of participants 414, 414' may opt not to access HBE 412. Customers 418' would thus interact with participants 414, 414' as purchasers of general goods and services while obtaining information and technology services from sources other than HBE 412, if desired. Significantly, and unlike the traditional franchise system 310 depicted in FIG. 3, participants 414, 414' are free to obtain any of an assortment of business support mechanisms 416 through HBE 412, which mechanisms are not proprietary goods or services or other items that controlled, authorized or mandated for purchase by HBE 412. Further, the HBES 410 permits the participants 414, 414' to obtain other business support mechanisms from suppliers 420 which are not affiliated with the HBES 410, if the participants so desire.

Some of the many advantages HBES 410 provides participants 414, 414' include:

1. assigned trade territories;
2. non-proprietary, entirely optional, menu-driven business support mechanism offerings through HBE 412;
3. completely independent operation and control of the participants' businesses;
4. national and global "brand name" presence and other marketing support and their associated incremental revenue;
5. access to state-of-the-art information technology;
6. discounted capital financing for purchase of expensive technology, machinery, vehicles and the like;
7. discounted goods and services for resale;
8. logistics support;
9. freedom to conduct business and obtain products, services and other business support mechanisms outside the HBES; and
10. business consulting services; and
11. equity benefits and no inventory capital loss risk for stockholder participants.

In addition, generally in connection with equity participants, HBES 410 allows the participants to partially "cash out" on the value of their business without losing control as might otherwise occur through a roll up, merger or acquisition. Most participants would not have sufficient critical mass to execute an initial public offering or "IPO". HBES 410, through HBE 412, provides a platform for a participant to be part of an IPO without losing control of its business.

The functions of HBE 410 may be carried out substantially entirely manually by a staff of human operators with which the participants 414, 414' and the suppliers of business support mechanisms 416 may communicate with one another through a combination of telephone, facsimile and conventional computer network communication means. However, such an arrangement is labor and capital intensive, costly, frequently slow in operation and subject to human error. Accordingly, HBE 412 preferably conducts its operations on a fully integrated, multi-function electronic commerce system of a type having at least the capabilities described below.

Figure 5:
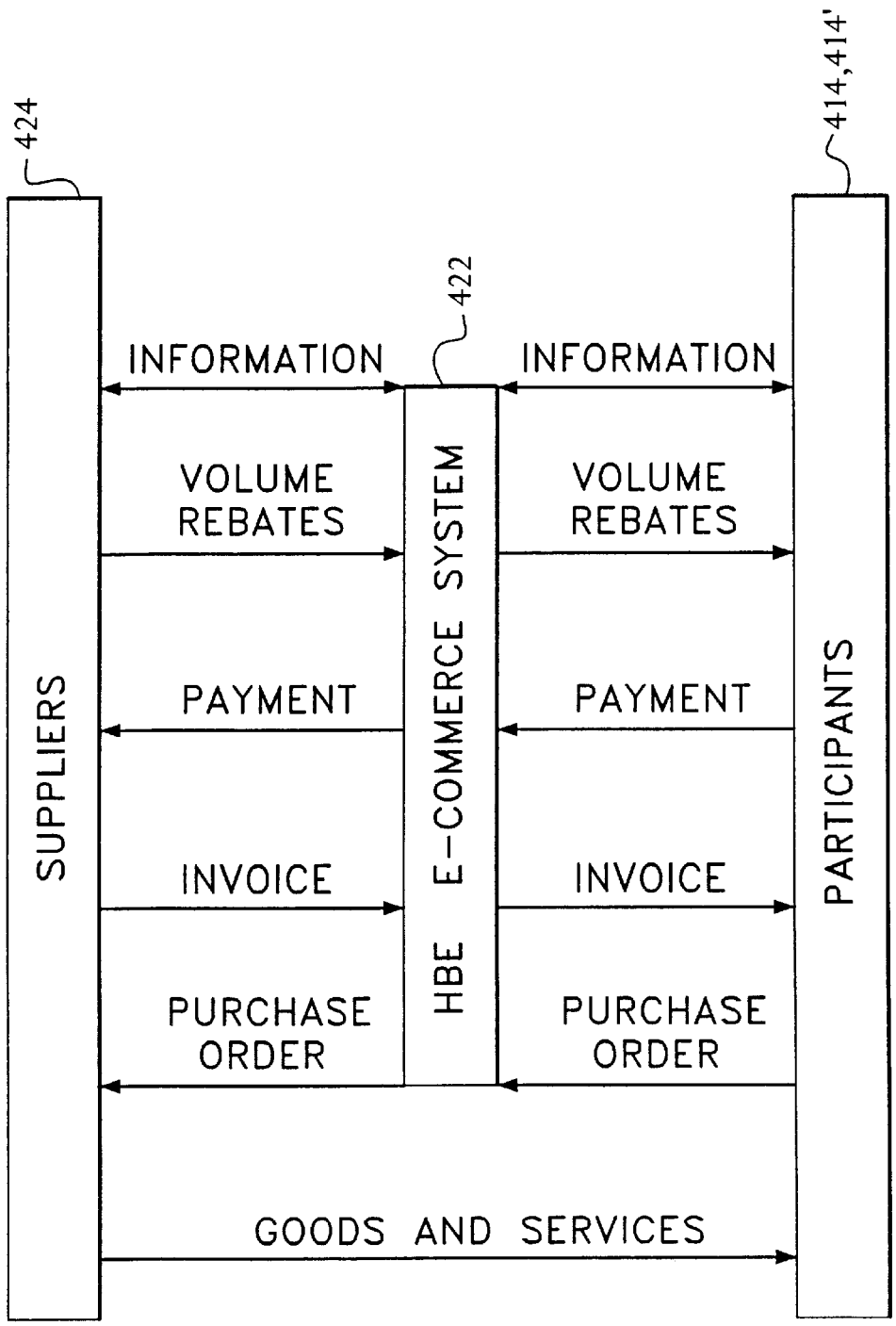
FIG. 5 is a schematic representation of the operation of an electronic commerce system adapted for use in the collective business system of the present invention.

FIG. 5 reveals the operation of e-commerce system 422 that may be used by the HBE 412 to implement and monitor transactions between suppliers 424 of business support mechanisms 416 and participants 414, 414' in the HBES 410. FIG. 5 represents a typical goods and services transaction between suppliers 424 and participants 414, 414'. A presently preferred e-commerce system 422 suitable for use in HBES 410 is a proprietary system obtainable from Litton Enterprise Solutions (LES) of Alexandria, Va. The hardware and software to implement the LES system may be customized as needed to accommodate the needs of an individual HBES 410. At minimum, however, the e-commerce system, regardless of its source, should function as an administrative interface between suppliers 424 and participants 414, 414'. More particularly, e-commerce system 422 should comprise a sophisticated electronic data interchange (EDI) whereby limitless numbers and types of transactions may be substantially instantaneously effectuated between participants 414, 414' and suppliers 424, thereby eliminating much of the inherent time, expense and error associated with a human-managed, paper-based control system. E-commerce system 422 preferably should provide an Internet website for the HBE 412 that may be accessed by suppliers 424, participants 414, 414' optionally, customers 418. As described in greater detail in connection with FIG. 6, the website may function as an advertising vehicle for the suppliers 424, participants 414, 414' and the HBE itself. It may also contain events, calendars, bulletin boards and news of interest to those in the HBES. The website should be capable of supporting and monitoring electronic mail, EDI or similar e-commerce transactions between suppliers 424, participants 414, 414' and, optionally, customers 418. As part of this functionality, the e-commerce system 422, through the website or otherwise, should contain or be accessible to a trading engine capable of managing all relevant transactional data as well as relevant archival databases. To standardize the format of the transactions, the EDI of the HBE e-commerce system should provide the suppliers 424 and participants 414, 414' with standardized interactive electronic forms, which are appropriate to their roles in the business relationship.

In a typical goods or services transaction employing the e-commerce system 422, a participant 414 or 414' may access the aforementioned website or dedicated network and makes a purchase request using a purchase order form available on the e-commerce system. The e-commerce system 422 forwards the purchase order to the desired supplier 424 via electronic mail or other electronic transmission. Upon receipt of the purchase order, the supplier 424 processes the order and, bypassing HBE 412, sends the selected goods and services directly to the participant 414 or 414'. Concurrently, or shortly thereafter, the supplier 424 accesses, or is automatically connected to, the e-commerce system and creates an electronic invoice for the purchased goods or services using an invoice form available on the e-commerce system and electronically forwards the invoice to HBE 412. The e-commerce system 422 then generates a corresponding electronic invoice, which may include the transactional markup chosen by HBE 412, and electronically forwards the invoice to the participant 414 or 414'. Upon receipt of the invoice from e-commerce system 422, the participant 414 or 414' makes payment electronically to HBE 412.

In turn for the many transactions between the suppliers 424 and participants 414, 414', the suppliers may offer volume rebates or other incentives that may be conveyed by HBE 412 through e-commerce system 422 to participant's 414, 414'. Also, through the vehicle of bulletin boards, news pages, hyperlinks and other means of conveying information on the HBE e-commerce system website, the participants 414, 414' and suppliers may continuously access and exchange information among themselves.

Figure 6:
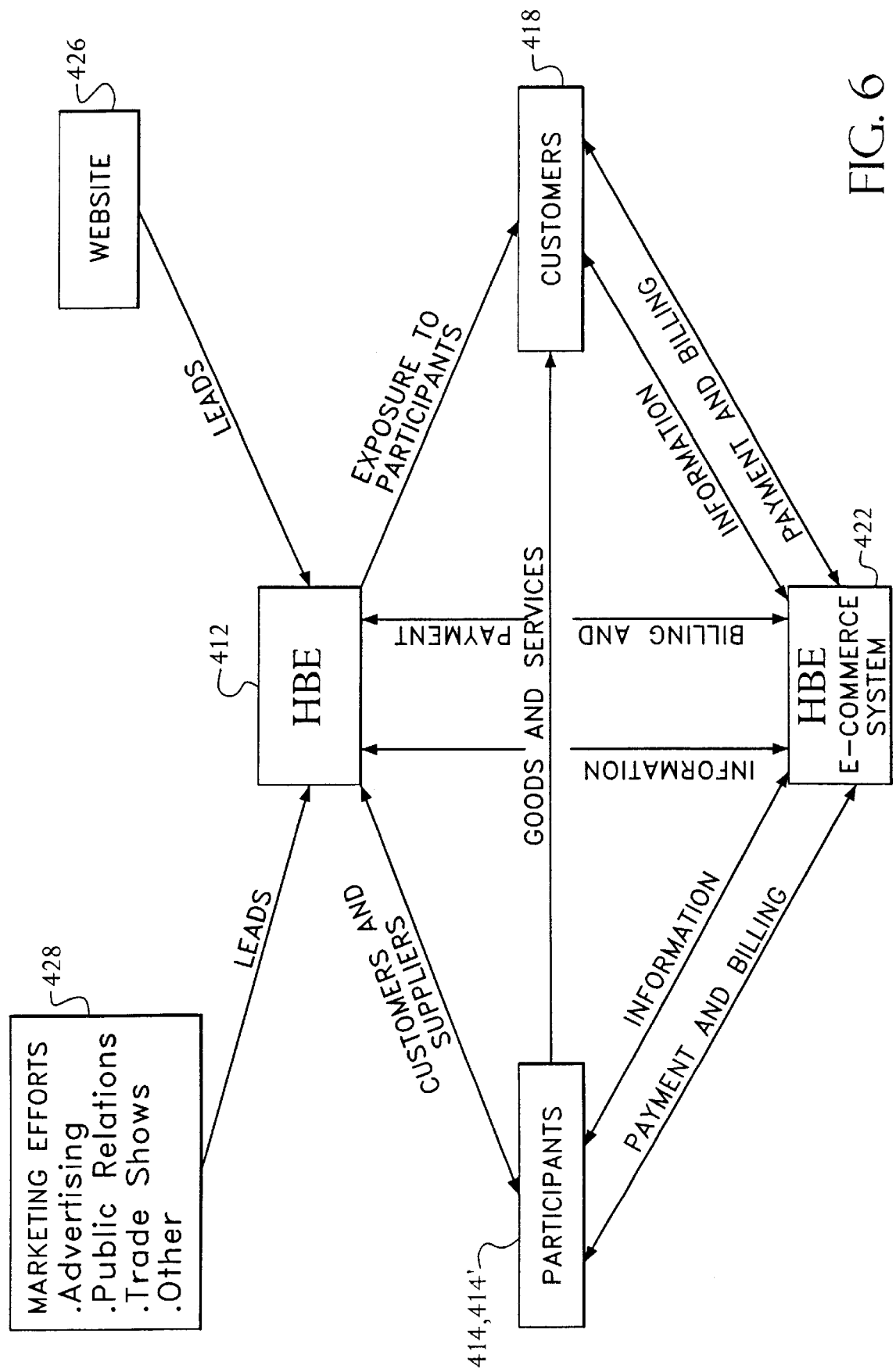
FIG. 6 is a schematic representation of the sales and purchasing process of the collective business system of the present invention.

FIG. 6 represents a typical manner by which the HBE e-commerce system 422 links participants 414, 414' with customers 418 while providing the participants with global exposure and brand name recognition marketing and sales through its relationship with suppliers 424 of goods and services. HBE 412 provides individual participants 414, 414' with greatly enhanced marketing and sales capability and presence by virtue of the HBE's establishment and maintenance of an Internet website 426. Website 426 may be created by HBE personnel or through a supplier 424. As is known, website 426 may be dedicated to providing any combination of the advertising, news, bulletin board, electronic mail, hyperlinks, electronic sales or other beneficial services normally supported by a sophisticated multi-functional website. Preferably, HBE 412 supplements its and, derivatively, its participants' Internet exposure through marketing efforts 428 including, but not limited to, advertising, public relations, trade show presentation or other disciplines which may serve to broaden potential pool of leads or customers of the HBE 412 and participants 414, 414'.

The HBE 412 provides itself and participants 414, 414' with a pool of customers while simultaneously providing eligible customers 418 with access to the goods and services offered by the participants. Customers 418 may in turn access e-commerce system 422 for information or to order purchases of desired goods and services from participants 414, 414'. Customers 418 pay HBE 412 through e-commerce system 422 and the desired goods and services are delivered by the participants to the customers.

As noted above, HBES 410 may find useful application to any group of businesses, tradespersons or professionals in a common field of endeavor or industry that desire to retain their independence yet require an array of business support mechanisms to enable their effective competition with much larger, commonly nationally or internationally based, competitors. In a non-limitative example drawn from the transportation industry, participants 414, 414' may be independent full-service truck leasing companies. These companies must compete with several nationally based truck leasing companies that may have hundreds of local facilities or franchises dispersed throughout the United States and elsewhere.

To at least partially enhance their competitive position versus their larger competitors, some independent truck leasing companies have formed trade organizations or associations. These organizations may be structured such that their members receive exchanges of useful business information and reciprocal service discounts. Pursuant to a reciprocal service agreement, a truck leased from one member may be serviced at another member's facility without being subjected to excessive markups for the replacement parts or repair services. However, these benefits alone are insufficient in and of themselves to elevate the individual truck leasing companies to an equal competitive level with their larger counterparts. Independently owned and operated companies of this sort, as well as their existing and potential suppliers and customers, could reap the many benefits of HBES 410. Further, independent truck leasing companies, or other independent businesses analogously situated and associated, may participate in HBES 410 and maintain membership in their respective trade or professional organizations and additionally enjoy whatever benefits those organizations may offer.

Although the invention has been described in detail for the purpose of illustration, it is to be understood that such detail is solely for the purpose and that variations can be made therein by those skilled in the art without departing from the spirit and scope of the invention except as it may be limited by the claims.

What is claimed is:

1. A collective business system comprising:

a non-franchisor, for-profit hub business entity;

a plurality of non-franchisee participants assigned exclusive geographical territories of business operation by said hub business entity, said participants being engaged in a common field of business endeavor and being independently owned and operated relative to said hub business entity; and an electronic commerce system employed by said hub business entity and connecting suppliers of business support mechanisms of interest to said participants with at least one of said participants and customers of said participants, said electronic commerce system enabling transactions between said suppliers and said participants and customers of said participants.

2. The collective business system of claim 1 wherein said suppliers are independent of control by said hub business entity.

3. The collective business system of claim 1 wherein said hub business entity is a corporation.

4. The collective business system of claim 1 wherein said hub business entity is a partnership.

5. The collective business system of claim 1 wherein said business support mechanisms include marketing support.

6. The collective business system of claim 1 wherein said business support mechanisms include discount goods or services.

7. The collective business system of claim 1 wherein said business support mechanisms include discount capital financing.

8. The collective business system of claim 1 wherein said business support mechanisms include access to information technology.

9. The collective business system of claim 1 wherein said business support mechanisms include logistics support.

10. The collective business system of claim 1 wherein said business support mechanisms include business consulting services.

11. The collective business system of claim 1 wherein said hub business entity derives income from said transactions.

12. The collective business system of claim 1 wherein said hub business entity is substantially liquid asset based.

13. The collective business system of claim 12 wherein said hub business entity maintains no inventory of goods of said suppliers.

14. A method of operating a collective business system comprising the steps of:

(a) assigning, by a non-franchisor, for-profit hub business entity, exclusive geographical territories of business operation to a plurality of non-franchisee participants, said participants being engaged in a common field of business endeavor and being independently owned and operated relative to said hub business entity;

(b) connecting, via an electronic commerce system employed by said hub business entity, suppliers of business support mechanisms of interest to said participants with at least one of said participants and customers of said participants; and (c) enabling transactions between said suppliers and said participants and customers of said participants via said electronic commerce system.

15. The method of claim 14 wherein said suppliers are independent of control by said hub business entity.

16. The method of claim 14 wherein said hub business entity is a corporation.

17. The method of claim 14 wherein said hub business entity is a partnership.

18. The method of claim 14 wherein said business support mechanisms include marketing support.

19. The method of claim 14 wherein said business support mechanisms include discount goods or services.

20. The method of claim 14 wherein said business support mechanisms include discount capital financing.

21. The method of claim 14 wherein said business support mechanisms include access to information technology.

22. The method of claim 14 wherein said business support mechanisms include logistics support.

23. The method of claim 14 wherein said business support mechanisms include business consulting services.

24. The method of claim 14 wherein said hub business entity derives income from said transactions.

25. The method of claim 14 wherein said hub business entity is substantially liquid asset based.

26. The method of claim 25 wherein said hub business entity maintains no inventory of goods of said suppliers.

* * * * *